United States Patent Office 3,525,745
Patented Aug. 25, 1970

3,525,745
PROCESS FOR THE PREPARATION OF PERHALO-ALKOXY-s-TRIAZINES AND NOVEL PERFLU-OROALKOXY-s-TRIAZINES
Richard W. Anderson, Midland, Mich., assignor to The Dow Chemical Company, Midland, Mich., a corporation of Delaware
No Drawing. Continuation-in-part of application Ser. No. 632,952, Apr. 24, 1967. This application Jan. 23, 1969, Ser. No. 793,579
Int. Cl. C07d 55/48
U.S. Cl. 260—248
10 Claims

ABSTRACT OF THE DISCLOSURE

The invention is a process for the preparation of mono-, bis- and tris(perhaloalkoxy)halo-s-triazines. The process involves contacting a cyanuric halide with an alkoxide source material selected from the group of perhalomethoxide source material and secondary perhaloalkoxide source material. The process is carried out at a temperature not in excess of 25° C. in the presence of certain alkali metal fluorides. Also provided by the present invention are novel perfluoroalkoxy-s-triazines.

---

This application is a continuation-in-part of copending application Ser. No. 632,952 filed Apr. 24, 1967, now abandoned.

BACKGROUND OF THE INVENTION

The invention herein described was made in the course of, or under a contract or subcontract thereunder, with the Department of the Air Force.

Processes for the preparation of the polyhaloalkoxy-s-triazines are known. Such processes involve reacting a halo-triazine with a poly fluorinated alcohol to produce the alkoxy-s-triazine. These processes may not be used to prepare perhalogenated alkoxy-s-triazines due to the unavailability of alcohols which have halogen atoms attached to the carbon atom adjacent to the —OH group. Perhaloalkoxy-s-triazines are preferred over the incompletely halogenated alkoxy compounds because of their increased thermal and oxidation resistance.

Perhalogenated alkoxy-s-triazines have been prepared by reacting a halo-triazine with an incompletely halogenated alcohol to form an incompletely halogenated alkoxy-s-triazine and then chlorinating the compound to form the perhalo compound. However, perfluoroalkoxy-s-triazines are preferred over those perhaloalkoxy-s-triazines which contain halogens other than fluorine due to the greater thermal and oxidation resistance exhibited by the perfluoro compounds.

It is a principal object of the present invention to provide a process for the preparation of perhaloalkoxy-s-triazines.

It is another object to provide such a process which may be carried out in a single step.

A further object of the present invention is to provide perfluoroalkoxy-s-triazines as novel compositions of matter.

SUMMARY OF THE INVENTION

The present invention involves compounds of the following type:

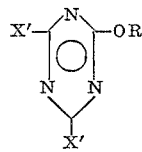

wherein R is a perfluorinated methyl or secondary aliphatic group containing from about 3 to about 20 carbon atoms and wherein X' is a halogen or alkoxide (—OR) with R being as above defined.

Also provided is a process for preparing the compounds above described and similar compounds in which R is a perhalogenated secondary aliphatic group containing from 3 to about 20 carbon atoms. As used herein, the term perhalo is intended to apply to those compounds in which the halogen is fluorine or chlorine.

The present process is practiced by contacting, in the presense of an alkali metal fluoride, selected from the group consisting of potassium fluoride, cesium fluoride and rubidium fluoride, a cyanuric halide with an alkoxide source material selected from the group consisting of perhalomethoxide source material and secondary perhaloalkoxide source material.

The process for the preparation of the compounds of the present invention is further characterized in that:

(a) The reaction is carried out at a temperature of from about a minimum temperature determined by the freezing point of the system to about 25° C. when the source material is a secondary perhaloalkoxide, and the molar ratio of alkali metal fluoride to the source material employed is less than about 1:1. When the molar ratio of alkali metal fluoride to the secondary source material is greater than about 1:1, the reaction is carried out at temperatures of from about —30° C. to about 5° C.

(b) The reaction is carried out at a temperature of from about a minimum temperature determined by the freezing point of the system to about 0° C., when the source material is a perhalomethoxide.

Compounds prepared by the process of the present invention are useful as chemically and thermally stable fluids, such as hydraulic and dielectric fluids. Such compounds are also useful as intermediates in the synthesis of oil additives, monomers and other fluids wherein thermal and oxidative stability are required at high temperature.

The perfluoroalkoxy-s-triazines of the present invention are of particular interest in that they contain only carbon, oxygen, fluorine and nitrogen as the elements of the molecule. The absence of hydrogen and halogens other than fluorine imparts excellent thermal and oxidation resistance to these preferred embodiments.

DETAILED DESCRIPTION OF THE INVENTION

In accordance with the present invention, the perhaloalkoxy-s-triazines are prepared by reacting a cyanuric halide, preferably cyanuric chloride, with an alkoxide source material, which is a secondary perhaloalkoxide in the presence of an inert, aprotic, polar, organic solvent and an alkali metal fluoride wherein the alkali metal is potassium, cesium or rubidium. Secondary perhaloalkoxides which may be used in the practice of the present invention are those which contain from 3 to about 20 carbon atoms. Perfluoromethoxide-s-triazines are prepared in a similar manner by reacting the cyanuric halide with a perhalomethoxide source material.

Carbonyl fluoride is the preferred methoxide source material. Other perhalomethoxides such as carbonyl chloride may be used as starting materials; however, since an alkali metal fluoride will be present in the reaction vessel, carbonyl fluoride will form in situ.

Preferred secondary perhaloalkoxide source materials are secondary carbonyl compounds corresponding to the formula

wherein $R_x$ and $R_x^1$ are straight or branched chain perhaloalkyl radicals containing from 1 to about 18 carbon atoms. The total carbons, i.e., the sum of those in $R_x$ and $R_x^1$, should not exceed about 19.

When it is desired to prepare perfluoroalkoxy-s-triazines other than the perfluoromethoxy compound, the secondary carbonyl compound is selected from those perfluorinated secondary carbonyl compounds containing from 3 to about 20 carbon atoms.

The alkali metal fluoride preferred for use in the practice of the present invention is potassium fluoride.

Preferably, the reaction is to be carried out in an inert solvent. Suitable solvents are those aprotic polar organic liquids which are inert to the reactants and products and which will dissolve these materials and remain liquid at the reaction temperature. Conveniently, the higher boiling ethers such as 2,2'-(dimethoxy)diethyl ether, N,N-dimethyl formamide, acetonitrile, tetramethylene sulfone, N,N-dimethylacetamide and the like are employed as solvents.

Usually, an addition product of the alkoxide source material and alkali metal fluoride is prepared by direct reaction of these reactants. The quantity of alkali metal fluoride employed is conveniently about that required for stoichiometric reaction with the alkoxide source material to form the 1:1 addition product, although it is preferred that the molar ratio of alkali metal fluoride to alkoxide source material employed be less than about 1, e.g. 0.85. At temperatures in excess of about 5° C., excess alkali metal fluoride present with the final perhaloalkoxy-s-triazine product may cause the product to undergo further undesired reactions. Consequently, a quantity of alkali metal fluoride in excess of a stoichiometric amount may conveniently be employed only at temperatures below about 5° C.

The resulting addition product, i.e., alkali metal perfluoro or perchlorofluoroalkoxide, is contacted with the cyanuric halide, usually in the presence of the inert solvent, at a maximum temperature of about 25° C. and at a minimum temperature of about −30° C. when the molar ratio of alkali metal fluoride to alkoxide source material is less than about 1:1 and the source material is a secondary perhaloalkoxide. When the molar ratio of alkali metal fluoride to secondary alkoxide source material is greater than about 1:1, the minimum temperature is determined by the freezing point of the system with the maximum reaction temperature being about 5° C. and preferred temperatures being from about −30° C. to about 0° C. When the source material is perhalomethoxide, the temperature is maintained within the range from the freezing point of the system to a maximum of about 0° C.

The reactants are contacted with each other for a time sufficient to allow a reaction to occur. Relatively effective reactions are usually obtained within 2 to about 48 hours, and conveniently from about 6 to about 24 hours. In most operations, the reaction mass is continuously agitated during this period.

The process usually is carried out under the autogenous pressure of the reaction mixture but either higher or lower pressures can be used.

The relative quantities of cyanuric halide reactant and alkoxide source material to be employed are not critical. Usually, at a minimum, about stoichiometric amounts as needed to provide a predetermined alkoxy product are used. When the tris(perhaloalkoxy)halo-s-triazine is produced, ordinarily an excess of the alkoxide reactant is used, e.g., up to about 500 weight percent of that required stoichiometrically to form this compound.

Alternatively, the cyanuric halide reactant, alkoxide source material and alkali metal fluoride can be introduced at the same time into a reaction vessel along with the solvent. It is not necessary to first separately prepare the alkoxide source material alkali metal addition product.

Following the reaction period, usually the product mass is separated and the alkoxy-s-triazine products recovered and purified as by fractional distillation, vapor phase chromatography or other liquid-liquid separatory procedures.

The following examples will serve to further illustrate the present invention.

EXAMPLE 1

An addition product of potassium fluoride and hexafluoroacetone was prepared by reacting in a pressure vessel at room temperature about 7.25 grams (0.125 gram mole) of potassium fluoride and about 25 grams (0.15 gram mole) of hexafluoroacetone in 100 milliliters of diglyme. The reactor then was cooled to about minus 10° C. and 7.7 grams (0.042 gram mole) of cyanuric chloride introduced therein.

This reaction mixture was stirred and its temperature increased from about minus 10° to about minus 3° C. over a period of 6 hours under the autogenous vapor pressure of the mass. Following this reaction period, the cold product was extracted with 800 milliliters of water while maintaining the temperature below about minus 3° C. About 21.6 grams of product was recovered. This is about 86% conversion to isoperfluoropropoxy-s-triazine (2,4,6 - tri-isoperfluoropropoxy-1,3,5-triazine), based on cyanuric chloride as the limiting reactant.

Elemental chemical analysis gave F—63.0%, C—23.1%. Theoretical percentages of F and C calculated for the indicated triazine product are F—63.0%; C—22.8%.

The product was a clear colorless liquid boiling at 187° C. at an atmospheric pressure, i.e., about 750 mm. Hg.

Infrared spectroscopy showed major absorbance peaks at 6.4, 7.3, 7.7, 8.0–8.3 (broad band), 8.5–9.0 (broad band), 9.8 and 10.2. These are consistent with the assigned structure.

Nuclear magnetic resonance data are consistent with the assigned structure.

EXAMPLE 2

Following the same general procedure set forth in Example 1, about 16.0 grams of carbonyl fluoride ($COF_2$) and 11.8 grams of potassium fluoride in about 200 milliliters of acetonitrile were reacted in a pressure vessel at room temperature for about 21 hours and allowed to remain in the reactor for 48 hours. The residual pressure on the mass indicated the reaction was substantially complete after the 21 hours. The reactor was cooled to about minus 2° C., opened under an inert atmosphere (nitrogen) and 10 grams of cyanuric chloride added thereto. The reactor was sealed and stirred at about minus 2° C. for 4 hours, at minus 10° C. for 4 hours and then cooled to minus 40 and slowly warmed to 1° C. over about 17 hours.

At the end of the reaction period, the cold product was poured into a separatory funnel containing 200 milliliters of n-hexane. The resulting layers were very difficult to separate because of solids in the mass. The solids, later identified as a mixture of potassium salts, were removed by filtration whereupon two readily separable liquid layers remained.

The upper layer (hexane) was separated by vacuum transfer through a distillation column; no products were found in this layer. The lower layer (acetonitrile) was subjected to low pressure at room temperature and the bulk of the solvent pumped off. The final 50 milliliters of solution were placed in a 100 milliliter round-bottom flask and connected to a distillation column and the remaining acetonitrile removed at about 30° C. under an absolute pressure of about 20 mm. mercury.

After the acetonitrile was removed, the product was found to be a mixture of liquids and solid particles. About 20 milliliters of trichloro-trifluoroethane solvent was added to the reactor, and the solvent insoluble solids (later shown to be cyanuric chloride) were separated by filtration and the solvent evaporated from the filtrate.

The liquid product thus recovered, which weighed about 3.5 grams, was purified by vapor phase chromatography. Upon analysis it was characterized as 2-perfluoromethoxy-4,6-dichloro-s-triazine of the empirical formula (CNCl)₂CNOCF₃

Elemental chemical analysis for the product showed C—20.76%; F—23.5%; Cl—30.73%. Theoretical analysis for the compound is C—20.50%; F—24.35%; Cl—30.34%.

The infrared spectrum showed absorbancy peaks at 6.6, 7.2, 7.8–8.9 (broad multiplet); 9.7, 11.3, 11.8, 12.5 and 14.75 microns which supported the assigned structure.

Nuclear magnetic resonance analysis showed a single peak 58.22 (from CFCl₃). This is consistent with the assigned structure.

Mass spectroscopy indicated the following components in descending order of concentration M⁺, CF₃⁺, (CN)₂Cl⁺, COCF₂⁺, (M⁺—Cl), CNCl⁺, (M⁺—CNCl).

These data also are consistent with the compound structure.

In a second study, about 6.6 grams of carbonyl fluoride and 5.8 grams of potassium fluoride in 100 milliliters of acetonitrile were reacted in a pressure vessel at room temperature for about 16 hours. The reaction mass was then cooled to about minus 15° C. and 18.0 grams of cyanuric chloride dissolved in 120 milliliters of acetonitrile poured into the reactor. The reactor was again sealed and the reaction mass agitated continuously for a period of 6 hours while maintaining the temperature at from about minus 10 to about minus 2° C.

The liquid product phase was separated from residual solids. The solvent was removed from the liquid product mass and the resulting solid and liquid mixture treated with trichloro-trifluoroethane solvent to separate the two phases as described for the previous study.

After evaporation of this solvent from the liquid phase, the product was purified by vapor phase chromatography.

The mass spectroscopy analysis and infrared spectrum were the same as for the product of the previous run, thus indicating the product was 2-perfluoromethoxy-4,6-dichloro-s-triazine.

EXAMPLE 3

About 76.2 grams of the 1:1 addition product of hexafluoroacetone and potassium fluoride in 200 milliliters of acetonitrile were reacted with 51.8 grams of cyanuric chloride at a temperature of from minus 5° up to 18° C. for a total period of 20 hours.

The liquid product was recovered following the general technique set forth hereinbefore, and, separated and purified by vapor phase chromatography. Three products were recovered from this liquid. These, upon analysis, were found to consist of tris(perfluoroisopropoxy)-s-triazine, 2,4 - bis(perfluoroisopropoxy) - 6-chloro-s-triazine and 2-perfluroisopropoxy-4,6-dichloro-s-triazine.

EXAMPLE 4

About 14 grams of carbonyl fluoride and 8.1 grams of potassium fluoride were reacted in 100 milliliters of acetonitrile for 24 hours at room temperature following the technique described in the preceding examples.

About 9.2 grams of cyanuric chloride were added to the reactor, which had been cooled to about 0° C., and the resulting mixture agitated for about 24 hours at 0° C.

The product mass was treated following the general procedure set forth in the preceding examples and about 5.5 grams of a liquid product recovered. Separation of this liquid into its components by vapor phase chromatography gave three components. They were identified as mono-, bis- and tris-perfluoromethoxy derivatives of cyanuric chloride.

In a manner similar to that described in the preceding examples, other perhaloalkoxy-s-triazines may be prepared by reacting a cyanuric halide with other secondary perhaloalkoxide source materials which correspond to the general formula

wherein $R_x$ is a straight or branched chain perhaloalkyl group containing from 1 to about 18 carbon atoms and $R_x'$ is a straight or branched chain perchloro, perfluoro or per-chloro-fluoroalkyl group containing from 1 to about 18 carbon atoms.

Specific examples of secondary alkoxide source materials suitable for use in the present invention are perchloro, perfluoro or per(chlorofluoro)acetone, pentanone, octanone, decanone, tetradecanone, octadecanone and eicosanone.

I claim:

1. A process for the preparation of perchloro, perfluoro or per(chlorofluoro)alkoxy-s-triazines corresponding to the formula:

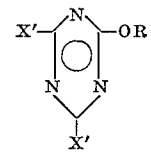

wherein R is selected from the group consisting of perfluoro methyl and secondary perfluoro or per(chlorofluoro) alkyl groups containing from 3 to about 20 carbon atoms and wherein X' is a halogen or alkoxide (—OR), with R being as defined above which comprises:
  (a) contacting, in the presence of potassium fluoride, cesium fluoride or rubidium fluoride, a cyanuric halide with a perchloro, perfluoro or per(chlorofluoro) methoxide or secondary perchloro, perfluoro or per(chlorofluoro)alkoxide source material containing from 3 to about 20 carbon atoms,
  (b)—
    (i) maintaining the temperature within a range from a minimum determined by the freezing point of the system to a maximum of about 5° C. when a secondary perhaloalkoxide source material is used and the molar ratio of alkali metal fluoride to perhaloalkoxide source material is greater than about 1:1,
    (ii) maintaining the temperature within a range from a minimum of about −30° C. to a maximum of about 25° when a secondary perhaloalkoxide source material is used and the molar ratio of alkali metal fluoride to perhaloalkoxide source material is less than about 1:1,
    (iii) maintaining the reaction temperature within a range from a minimum determined by the freezing point of the system to a maximum of about 0° C. when the perhaloalkoxide source material is a perhalomethoxide,
  (c) recovering the reaction product.

2. The process of claim 1 wherein the alkali metal fluoride is potassium fluoride and the source material is a perhalomethoxide.

3. The process of claim 1 wherein the perhaloalkoxide source material is a secondary perfluoro carbonyl compound.

4. The process of claim 1 wherein the perhaloalkoxide source material is hexafluoroacetone.

5. The process of claim 1 wherein the cyanuric halide is cyanuric chloride.

6. A perfluoroalkoxy-s-triazine corresponding to the formula:

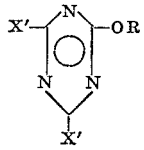

wherein R is selected from the group consisting of the perfluorinated methyl group and secondary perfluorinated alkyl groups containing from 3 to about 20 carbon atoms and wherein X' is a member selected from the group consisting of halogen and alkoxides (—OR), the R group being as defined above.

7. The perfluoroalkoxy-s-triazine as defined in claim 6 wherein R is the perfluoroisopropyl group or perfluoromethyl group.

8. A perfluoroalkoxy-s-triazine corresponding to the formula:

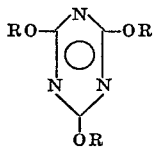

wherein R is the perfluoroisopropyl group.

9. The process of claim 2 wherein the perhalomethoxide source material is carbonyl fluoride.

10. The perfluoroalkoxy-s-triazine of claim 6 wherein R is the perfluoromethyl group.

References Cited

UNITED STATES PATENTS

| | | | |
|---|---|---|---|
| 2,741,606 | 4/1956 | Holt et al. | 260—248 |
| 2,994,595 | 8/1961 | Condo et al. | 260—248 XR |
| 3,250,772 | 5/1966 | Dexter et al. | 260—248 |
| 3,313,731 | 4/1967 | Dolle et al. | 260—248 XR |
| 3,316,263 | 4/1967 | Ross et al. | 260—248 |

OTHER REFERENCES

Breed et al.: J. Chem. Eng. Data, vol. 10, pp. 384–5 (1955).

Breed et al.: J. Org. Chem, vol. 30, pp. 3324–5 (1965).

JOHN D. RANDOLPH, Primary Examiner

J. M. FORD, Assistant Examiner

U.S. Cl. X.R.

252—63.7, 78